Feb. 9, 1971 D. SPAHRBIER 3,562,019
RESERVE FUEL CELL BATTERY
Filed April 12, 1968
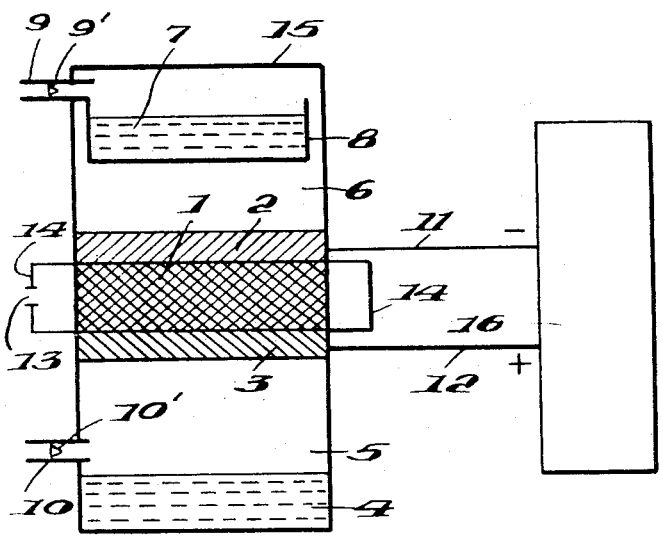
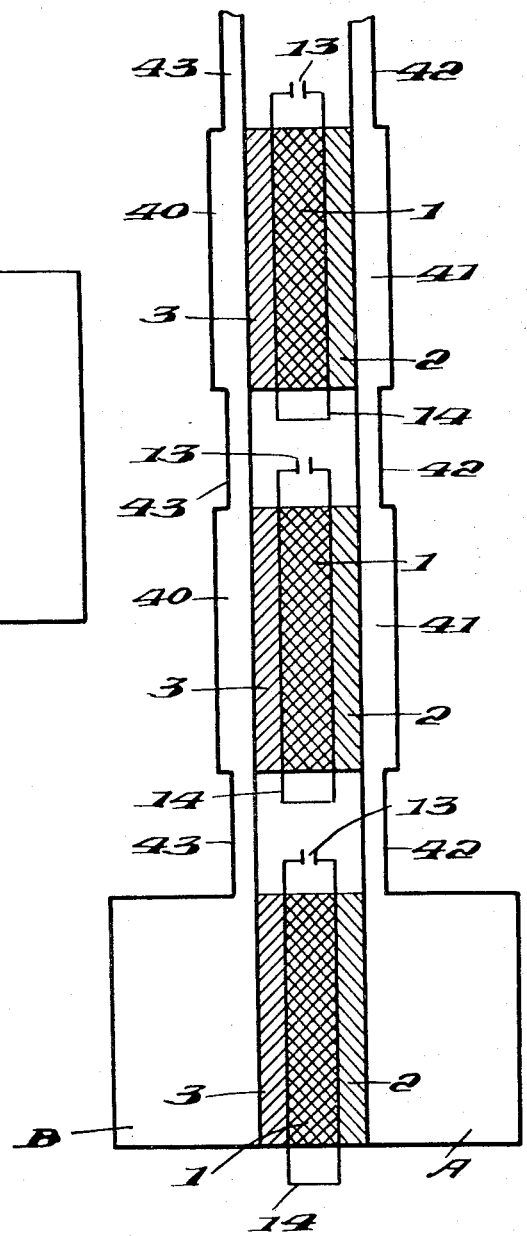
INVENTOR
DIETER SPAHRBIER,
BY Stephens, Huettig & O'Connell
ATTORNEYS

United States Patent Office 3,562,019
Patented Feb. 9, 1971

3,562,019
RESERVE FUEL CELL BATTERY
Dieter Spahrbier, Frankfurt am Main, Germany, assignor to Varta Aktiengesellschaft, Frankfurt am Main, Germany
Filed Apr. 12, 1968, Ser. No. 720,940
Claims priority, application Germany, July 8, 1967, V 34,028
Int. Cl. H01m 27/00
U.S. Cl. 136—86
17 Claims

ABSTRACT OF THE DISCLOSURE

Reserve fuel cell battery with liquid oxygen and hydrogen gas yielding materials and electrolyte stored therein.

BACKGROUND OF THE INVENTION

(1) Field of the invention

The invention relates to the field of reserve type fuel cell batteries.

(2) Description of the prior art

German Pat. 1,180,433 discloses a process for the operation of hydrogen diffusion electrodes in fuel cell batteries in which an alkaline electrolyte solution is supplied to the electrode, and wherein the solution contains sodium borohydride.

British Pat. 963,254 discloses a fuel cell in which a solution of hydrogen peroxide is forced through the porous electrode and the excess electrolyte is removed from the chamber between the two electrodes together with water which is formed. The hydrogen electrode of this fuel cell can be operated with a solution which contains hydrazine as the source of the hydrogen.

SUMMARY OF THE INVENTION

An object of the present invention is to provide compact reserve type fuel cell batteries of simple construction.

Another object of the present invention is to provide reserve type fuel cell batteries which have long shelf life periods and which can be readily activated without the need for a special or complicated start up procedure.

A further object of the present invention is to provide reserve type fuel cell batteries which are readily rechargeable with operating materials after a period of use so as to render them reusable in a facile manner.

The essence of the present invention resides in reserve fuel cell batteries which employ hydrogen and oxygen gas diffusion electrodes and aqueous electrolyte and wherein the raw materials for operating the battery are stored in the battery.

BRIEF DESCRIPTION OF THE DRAWING

FIG. 1 shows a fuel cell battery of the present invention.
FIG. 2 shows a multi-battery unit of the present invention.

DESCRIPTION OF THE PREFERRED EMBODIMENTS

The reserve type fuel cell batteries of the present invention contain fuel cell elements which comprise porous hydrogen and oxygen gas diffusion electrodes and operate with an aqueous electrolyte. The supply of hydrogen and oxygen to the electrodes is accomplished by providing hydrogen or oxygen yielding materials, in liquid or dissolved form, which materials are then decomposed into the desired gases on the catalyst provided for this purpose in the respective electrodes.

According to the present invention, at least one storage container for the hydrogen or oxygen yielding materials is permanently annexed to the fuel cell element of the battery in such a way that the level of such fluid materials in the containers is below discharge openings in the container during the period in which the battery is to be maintained in a standby or reserve position, and at least one of such discharge openings leads to the catalytically active layer of the electrodes.

The storage containers for the liquid gas yielding materials may be placed either in the gas chambers of the respective electrodes or they may be placed outside such gas chambers, but they are in any event, compactly joined to the fuel cell element.

By moving or turning the fuel cell element from the standby position to an operating position the gas yielding material is caused to flow out of its container and into the catalyst and there it is completely decomposed within a short time. The formation of the gases on the catalyst takes place faster than the electrochemical reaction of the gases on the electrodes.

The electrolyte chamber of the fuel cell element can be filled with free liquid electrolyte. The escape or seepage of the electrolyte into the gas chamber of the electrodes during storage of the batteries is prevented by maintaining a slight excess gas pressure in the gas chambers by the use of an inert gas. The necessary inert gas pressure need only be a few percent higher than the hydrostatic pressure of the electrolyte. In addition to nitrogen, the rare gases of the argon group can also be used as the inert gases for this purpose. Hydrogen gas can also be used for providing the excess gas pressure in the gas chamber of both the hydrogen and the oxygen electrodes during storage of the batteries. It is preferable, in preparing the fuel cell elements having free electrolyte therein for the batteries of the present invention, that there be used as the electrodes in such elements, double layered electrodes which are known to those in the art and which have a fine pored cover layer on the side facing the electroylte and a coarse pored working layer on the gas chamber side.

In a preferable form of the battery of the present invention, there is placed between the hydrogen and oxygen electrodes in the battery, a non-conducting fine pored diaphragm in which the electrolyte is placed. In this type of arrangement it is not necessary to maintain an excess gas pressure in the gas chambers of the electrodes during the storage of the battery in order to prevent escape of the electrolyte into the gas chamber. After the operation of the battery the liquid reaction products end up within the porous diaphragm. The exchange of the fluid electrolyte with the fluid reaction products in this form of the battery is favored, since only the non-conducting fine pored diaphragm, together with the electrolyte fluid remaining therein and the liquid reaction products needs to be exchanged after a period of operation of the battery.

As the liquid carrier for the liquid or dissolved fuel it is preferable to use a liquid which is inert to the electrolyte. In the simplest case, the hydrogen or oxygen yielding material is mixed with, or dissolved in, the electrolyte.

In the fuel cell batteries of the present invention it is preferable to use a form of fuel cell elements in which the decomposition of a fluid gas yielding material only takes place in one fuel cell element in a battery which contains a plurality of fuel cell elements and the gas chambers of the electrodes of the gas producing elements are connected to the gas chambers of the other elements.

The fuel cell elements of the batteries of the present invention operate discontinuously in the sense that the gas generating materials are decomposed into gas on the catalysts only when the fuel cell elements are brought from a standby position into an operating position.

In installations, in which the fuel cell batteries are to operate over longer periods of time it is preferable to use a form of the invention in which containers are connected to the gas chambers of the electrodes, which containers have liquid or dissolved gas yielding materials therein and which materials have access to a special catalyst bed for the generation of oxygen or hydrogen gas. In this way it is possible to gradually feed the fluid to the catalyst bed and to assure the generation of gas over a longer period of time.

The drawings show a few of the possible forms of the batteries of the present invention.

FIG. 1 shows a reserve battery of the present invention in a standby or reserve position. The operating position of the battery is attained by turning the battery so that electrolyte discharge opening 13 is at the top position. On either side of fine pored non-conducting diaphragm 1, which is filled with $6n$ aqueous sodium hydroxide, there is a porous hydrogen gas diffusion electrode 2 and a porous oxygen gas diffusion electrode 3. The storage or supply container for the oxygen yielding material, a 3% by weight aqueous solution of hydrogen peroxide, is formed by the lower part 4 of gas chamber 5.

Storage or supply container 8 is arranged in hydrogen gas chamber 6 and it is filled with a solution of sodium borohydride in $6n$ sodium hydroxide. In outlet nozzles 9 and 10 there are placed safety valves 9' and 10', respectively, as pressure relief means for the venting of excess amounts of gas in the event that the safe limits of the gas pressure in chambers 5 and 6 are exceeded. Electricity consumer 16 is connected to electrodes 2 and 3 by means of juncture lines 11 and 12. The area of the electrolyte chamber which lies outside the area between the electrodes is enclosed by outer hollow chamber 14 which encircles the outer wall 15 of the battery and in chamber 14 there is located a needle sized opening as excess fluid drainage means for the escape or drainage of excess amount of electrolyte or other liquids as noted below. Valves 9" and 10" in outlet nozzles 9 and 10, respectively, can also be used as supply valves for the filling of supply containers 4 and 8 with new fluid when the battery is placed in a standby or reserve position.

By slightly overfilling storage container 8 during the charging thereof with the borohydride solution, the excess borohydride will flow out over the walls of container 8 and come in contact with the catalyst in hydrogen gas diffusion electrode 2 and be catalytically decomposed into hydrogen gas, so that hydrogen electrode 2 is filled with hydrogen gas and is thus placed in an operating state, as compared ot oxygen electrode 3 which is in a standby state. Since consumer 16 has a definite inner electrical resistance, the oxygen electrode 3 is thus placed at the potential of the hydrogen electrode 2 and deterioration of the oxygen electrode becomes negligible.

If the fuel cell battery is tipped or turned from the standby position into an operating position as by turning it on its side, the hydrogen peroxide solution flows from container 4 onto the catalytically active working layer of oxygen gas diffusion electrode 3 and is catalytically decomposed whereby a certain positive pressure of oxygen gas is generated. The solution of sodium borohydride 7 is also brought into contact with hydrogen gas diffusion electrode 3, when the battery is placed in an operating position, and is decomposed on the catalyst in such electrode. By a suitable choice of the corresponding amounts of hydrogen peroxide and sodium borohydride which are charged into the battery, the gas pressures that result from the decomposition of these materials can be so regulated that a gas pressure of about 1.5 atmospheres excess presure can be provided for each gas at the beginning of the operation of the battery. By a suitable choice of the construction of the electrodes it is possible to so form the electrodes that are operable even at a pressure 0.5 atmosphere excess pressure.

A few seconds after the battery is turned to an operating position, it is providing electrical energy. The liquid by-products formed by the decomposition of the gas yielding liquid materials are forced through the electrodes, by the pressure of the generated gases, into diaphragm 1 which may be formed of a layer of asbestos.

The additional volume of liquid in diaphragm 1 is accumulated in hollow-ring shaped chamber 14, and needle valve 13, which remains open when the battery is in an operating position, operates in such a way that no back pressure is allowed to form in hollow ring 14 and the excess fluid can flow out of area 14. It is preferable that container 7 be so proportioned, and the concentration of the hydrogen yielding material be so regulated that container 7 is always made somewhat larger than the container for the oxygen yielding material in order to avoid having the hydrogen electrode become deactivated due to the generation of an excess amount of oxygen gas during the operation of the battery.

FIG. 2 shows a battery installation of the present invention in which a single set of gas generating chambers are used to service a plurality of hydrogen and oxygen electrodes.

In the installation of FIG. 2 a plurality of battery elements each of which comprises a porous membrane 1, a porous hydrogen electrode 2, a porous oxygen electrode 3, and a hollow chamber 14 with needle valve 13. A common supply of hydrogen gas is generated for all the hydrogen electrodes in Chamber A and the hydrogen gas is fed to the hydrogen electrodes through conduit 41 which is formed by housing 42. In a similar way a common supply of oxygen gas is generated for all the oxygen electrodes in Chamber B and the oxygen gas is fed to the oxygen electrodes through conduit 40 which is formed by housing 43.

The gas yielding materials need not be placed in the batteries of the present invention in liquid form or in unsealed containers. For the purposes of transporting the batteries, and also to insure the desired shelf life of the batteries, the gas yielding materials may be placed in the batteries, in liquid form, in containers which may be readily ruptured or opened in order to allow the fluid to reach the catalyst in the gas generating chambers of the electrodes. These containers may then be ruptured or opened when it is desired to set the battery in operation. Such batteries need not therefore be kept at a level position during the storage or transportation thereof.

When using hydrogen or oxygen yielding materials which show a marked tendency to autodecomposition in the dissolved state without the need for contact with a catalyst, a preferred form of the battery of the present invention may be employed in which the storage container for the gas yielding materials contains a solvent which would cause such autodecomposition and the soluble gas yielding materials are placed, in a completely encapsulated form, in such solvent, together with a device for opening the capsules when the operation of the battery is desired.

In Chamber A of the installation of FIG. 2, for example, solid sodium borohydride and water can be packaged separately until such time as the operation of the battery is desired whereupon the water and sodium borohydride can be readily brought into contact by a variety of mechanical means, such as by puncturing containers holding the respective materials, and the resulting solution will automatically generate hydrogen gas, i.e.,

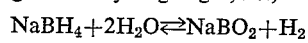

In a similar way Chamber B of the installation of FIG. 2 can be provided with containers of solid sodium peroxide and water for the production of oxygen gas.

In such an installation the preferable electrolyte is sodium hydroxide since the decomposition of the sodium peroxide will also lead to the generation of a continuous supply of such electrolyte, i.e.,

In contrast to the conventional primary and secondary cells, the fuel cell batteries of the present invention can be reused again each time they are used by simply refilling the gas yielding material supply containers with the necessary materials and, if necessary, by also simply exchanging the porous diaphragms of a used battery with diaphragms which have a fresh supply of electrolyte therein.

The batteries of the present invention can be stored for long periods of time and can be readily placed in an operating condition as noted above.

The batteries of the present invention are particularly suitable for those applications in which they must be stored in a non-operating condition for long periods of time and then quickly placed in operation, by simple mechanical means, as for example, in an emergency telephone equipment, in an emergency transmitter located in a remote area, in safety devices, and in other installations of this type.

We claim:

1. A reserve fuel cell battery comprising:
   a housing therefor, and within said housing at least one set of each of a hydrogen gas diffusion electrode and an oxygen gas diffusion electrode, each of said electrodes having a catalytically active gas side and an electrolyte side, gas chambers adjacent the gas side of each of said electrodes so that upon contact of such gas side with liquid gas yielding materials in the respective gas chambers gas will be generated for the operation of the electrodes adjacent such gas chambers,
   an electrolyte chamber between the electrolyte sides of each of such sets of electrodes adapted to maintain therein, during periods in which the battery is in a standby position, a charge of electrolyte needed to operate the electrodes adjacent said electrolyte supply chamber during the operation of said battery,
   liquid storage container means in at least one of the gas chambers holding, when said battery is in normal standby position, a charge of liquid gas yielding material needed to provide gas for the operation of the electrode adjacent such gas chamber out of contact with the adjacent electrode,
   said storage container means being positioned so that upon tilting of said battery from its normal standby position such charge of gas yielding material is delivered into gas generating contact with said electrode to generate the gas required for the operation of said battery, and
   means for delivering electricity from said battery to a consumer thereof during the operation of said battery.

2. A battery as in claim 1 in which said electrolyte supply chamber comprises a nonconducting porous diaphragm.

3. A battery as in claim 2 in which said porous diaphragm is made of asbestos.

4. A battery as in claim 2 in which said electrolyte supply chamber is in liquid supply communication with an excess fluid collection chamber adjacent said battery.

5. A battery as in claim 4 in which said excess fluid collection chamber has excess fluid drain means therein.

6. A battery as in claim 2 in which said electrolyte supply chamber is adapted to being replaced by another of such electrolyte supply chambers.

7. A battery as in claim 1 in which the gas sides of the electrodes are coarse pored and the electrolyte side of the electrodes is fine pored.

8. A battery as in claim 1 in which all the gas yielding materials are used in liquid form and all the gas yielding material container means are adapted to deliver the gas yielding materials to the catalytically active gas sides of the electrodes upon the tipping of the battery from a standby position to an operative position.

9. A battery as in claim 1 in which at least some of said gas chambers are equipped with excess gas pressure relief means.

10. A battery as in claim 9 in which said pressure relief means is adapted to supply liquid gas yielding material to the gas chambers.

11. A battery as in claim 1 which comprises a plurality of said sets of hydrogen and oxygen gas diffusion electrodes with an electrolyte supply chamber between each set of electrodes and a common oxygen gas chamber for all of the oxygen electrodes and a common hydrogen gas chamber for all of the hydrogen electrodes.

12. A reserve fuel cell battery comprising:
   a housing therefor, and within said housing at least one set of each of a hydrogen gas diffusion electrode and an oxygen gas diffusion electrode, each of such electrodes having a fine pored electrolyte side and a coarse pored, catalytically active, gas generating side, gas chambers adjacent the gas generating side of each of said electrodes, an electrolyte supply chamber between the electrolyte sides of each of such sets of electrodes comprising a porous diaphragm charged with electrolyte for the operation of the electrodes adjacent said electrolyte supply chamber during the operation of said battery and adapted to maintain said charge of electrolyte therein during periods in which the battery is in a standby position,
   liquid hydrogen-gas-yielding material storage container means in the gas chambers adjacent the gas generating sides of the hydrogen electrodes, said storage container being charged with liquid hydrogen-gas-yielding material for the operation of the hydrogen electrodes during the operation of said battery,
   liquid oxygen-gas-yielding material storage container means in the gas chambers adjacent the gas generating sides of the oxygen electrodes charged with liquid oxygen-gas-yielding material for the operation of the oxygen electrodes during the operation of said battery,
   all of said gas yielding material storage container means being adapted to store said charges of liquid gas-yielding materials out of contact with said electrodes during periods in which the battery is in a standby position, and
   to deliver said charges to the gas sides of said electrodes upon the tipping of the battery from a standby position to an operating position, and
   means for delivering electricity from said battery to a consumer thereof during the operation of said battery.

13. A battery as in claim 12 in which the charges of the gas generating materials are such as to provide operating gas pressures of about 1.5 to .5 atmospheres absolute pressure.

14. A battery as in claim 12 further comprising pressurized inert gas in the gas chambers during the standby position of the battery such as to prevent seepage of electrolyte into the gas chambers.

15. A battery as in claim 12 in which the oxygen gas yielding material is an aqueous solution of hydrogen peroxide.

16. A battery as in claim 12 in which the hydrogen gas yielding material is an aqueous solution of sodium borohydride.

17. A battery as in claim 12 in which the electrolyte is an aqueous solution of sodium hydroxide.

References Cited

UNITED STATES PATENTS

| | | | |
|---|---|---|---|
| 3,094,936 | 6/1963 | Lightfoot | 136—86 |
| 3,133,837 | 5/1964 | Edensohn | 136—86 |
| 3,159,506 | 12/1964 | Salathe | 136—86 |
| 3,364,071 | 1/1968 | Kordesch | 136—86 |
| 3,410,729 | 11/1968 | Manion | 136—86 |

WINSTON A. DOUGLAS, Primary Examiner

H. A. FEELEY, Assistant Examiner